United States Patent [19]

Dewitt et al.

[11] Patent Number: 4,934,209

[45] Date of Patent: Jun. 19, 1990

[54] STEERING COLUMN MOUNTED TRANSMISSION GEAR SHIFT MECHANISM HAVING IGNITION KEY INTERLOCK

[75] Inventors: Kenneth C. Dewitt, Farmington Hills; Eliot D. Shook, Birmingham; James F. Stewart, Clawson; Clarke F. Thacker, Livonia, all of Mich.

[73] Assignee: Ford Motor Company, Dearborn, Mich.

[21] Appl. No.: 324,126

[22] Filed: Mar. 16, 1989

[51] Int. Cl.⁵ .............................................. G05G 9/16
[52] U.S. Cl. ................................. 74/473 SW; 70/248
[58] Field of Search .............. 74/473 SW, 475 R, 475; 70/252, 185, 186

[56] References Cited

U.S. PATENT DOCUMENTS

| | | | |
|---|---|---|---|
| 3,490,255 | 1/1970 | Wight et al. | 70/248 X |
| 3,600,966 | 8/1971 | Anderson | 74/473 SW |
| 3,646,828 | 3/1972 | Milton | 74/473 SW X |
| 3,703,092 | 11/1972 | Elliott | 70/248 |
| 4,096,717 | 6/1978 | Cymbal | 70/248 |
| 4,132,123 | 1/1979 | Ishii et al. | 74/473 SW |
| 4,446,951 | 5/1984 | Morris | 74/473 SW X |
| 4,537,088 | 8/1985 | Kubota | 74/473 SW |

*Primary Examiner*—Peter A. Aschenbrenner
*Attorney, Agent, or Firm*—Frank G. McKenzie; Donald J. Harrington

[57] ABSTRACT

An ignition key mounted on the steering column of a motor vehicle turns a gear wheel as the key is rotated among multiple positions. The gear wheel continually meshes with a steering column lock actuator assembly and moves the assembly according to the position of the ignition key and gear wheel. The actuator assembly defines a cam surface, which causes a pawl to pivot when the ignition key is moved to a lock position and permits the pawl to return to an unlocked state when the ignition key is moved from the lock position. The gear shift mechanism includes a tube pivotably supporting a gear shift lever at one end and a control selector lever at its opposite end. A plunger, in continual contact with the gear selector lever and control lever, is resiliently biased by a spring toward a position that brings the control lever into contact with detent surfaces on an insert. The tube defines a slot, aligned axially with a recess formed on the plunger, displaceably mounted within the tube. When the gear selector lever moves to the Park position and the ignition key is in the Lock position, the pawl pivots through the tube slot and into a recess on the plunger, thereby preventing axial displacement of the shift mechanism. The plunger seals the tube slot and prevents entrance of the pawl when the gear selector is moved to any position other than park.

11 Claims, 3 Drawing Sheets

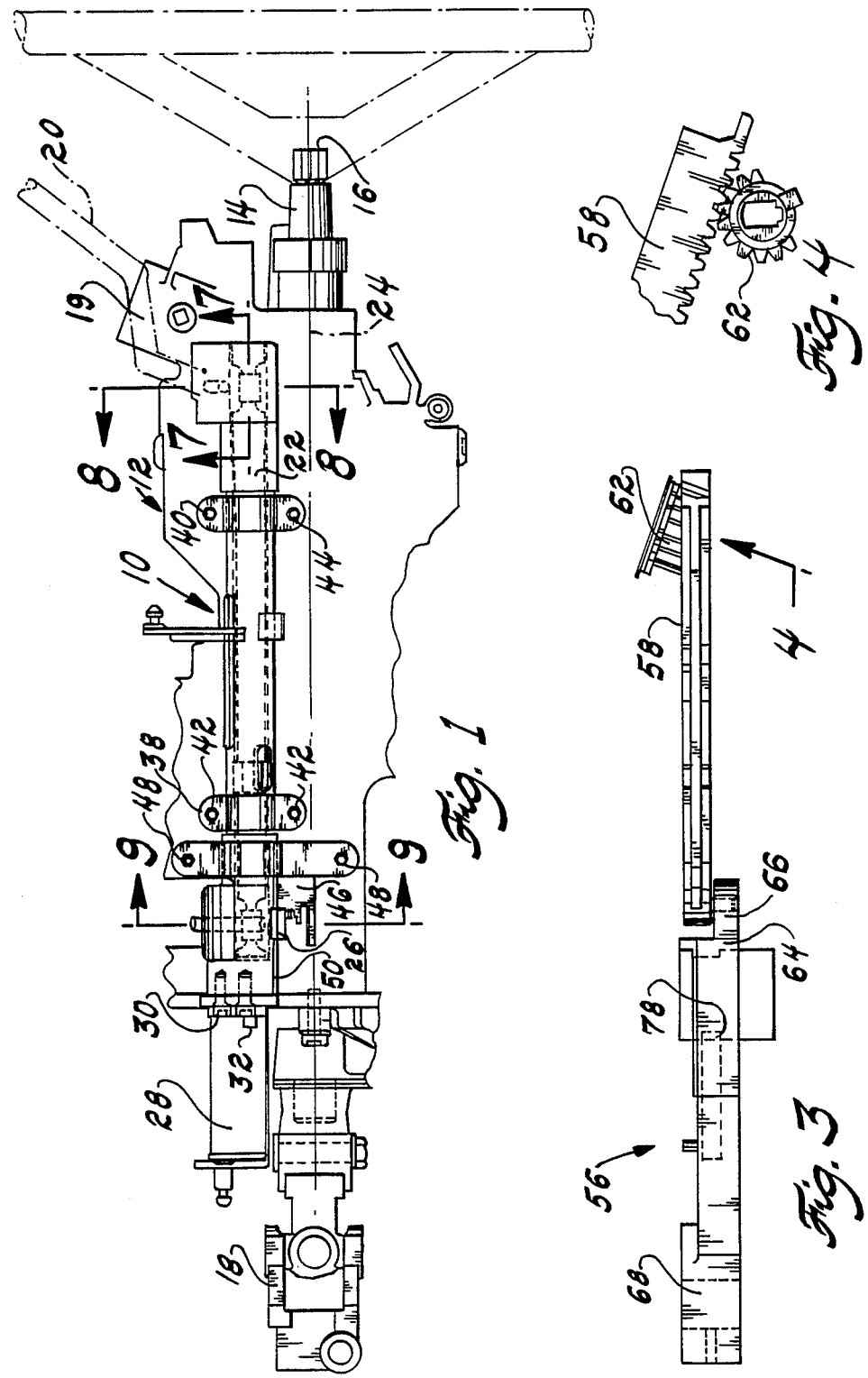

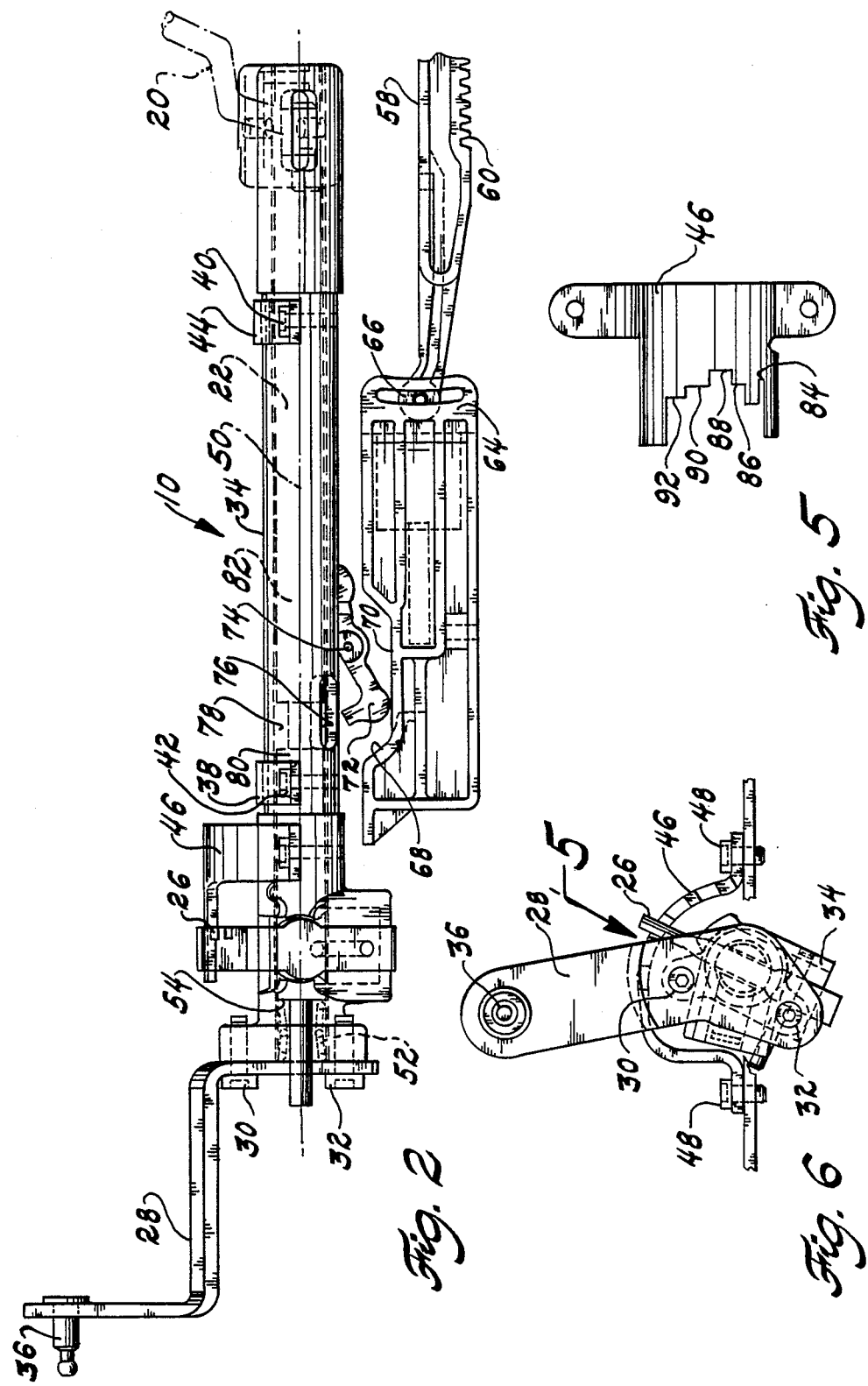

STEERING COLUMN MOUNTED TRANSMISSION GEAR SHIFT MECHANISM HAVING IGNITION KEY INTERLOCK

BACKGROUND OF THE INVENTION

1. Field of the Invention

This invention relates to a gear shift mechanism for an automatic transmission. More particularly, the invention pertains to such a mechanism that prevents removal of an ignition key from an ignition switch unless the shift mechanism is set at the park position.

SUMMARY OF THE INVENTION

An object of this invention is to provide a gear shift mechanism having an ignition key interlock for installation on a steering column assembly in which an air bag is stored. To realize this objective and provide space in which an evacuated air bag is stored in the steering wheel, the shift detents are located a substantial distance along the steering column length from the shift lever. In conventional gear shift mechanisms, the space near the shift lever where the selector lever and selector insert are located is unavailable to receive the air bag.

Another object of this invention is to require coordinated operation of the shift mechanism and ignition key such that the ignition key cannot be removed from the ignition switch unless the shift mechanism is set in the Park position. The key cannot be removed from the ignition switch unless it is rotated to the Lock position. The mechanism of this invention prevents rotation of the switch to the Lock position unless the shift mechanism is located with the selector lever resting on the Park detent.

Furthermore, a device according to this invention prevents movement of the gear shift lever from the Park position while the ignition switch is in the Lock position.

An ignition key mounted on the steering column of a motor vehicle turns a gear wheel as the key is rotated among multiple positions. The gear wheel continually meshes with a steering column lock actuator assembly and moves the assembly according to the position of the ignition key and gear wheel. The actuator assembly defines a cam surface, which causes a pawl to pivot when the ignition key is moved to a lock position, and permits the pawl to return to an unlocked state when the ignition key is moved from the lock position. The gear shift mechanism includes a tube pivotably supporting a gear shift lever at one end, and a control selector lever at its opposite end. A plunger, in continual contact with the gear selector lever and control lever, is resiliently biased by a spring toward a pOSition that brings the control lever into contact with detent surfaces on an insert. The tube defines a slot, which is aligned axially with a recess formed on the plunger displaceably mounted within the tube when the shift mechanism is moved to the Park position. When the gear selector lever moves to the Park position and the ignition key is in the Lock position, the pawl pivots through the tube slot and into a recess on the plunger, thereby preventing axial displacement of the shift mechanism. The plunger seals the tube slot and prevents entrance of the pawl when the gear selector is moved to any position other than Park.

BRIEF DESCRIPTION OF THE DRAWINGS

FIG. 1 is a top view of a transmission control selector assembly and steering column.

FIG. 2 is a side view of a selector assembly and ignition key interlock.

FIG. 3 is a top view of the ignition key interlock portion of the assembly of FIG. 2.

FIG. 4 is a view of FIG. 3 taken in direction 4.

FIG. 5 is a top view of the selector insert taken in direction 5, as indicated in FIG. 6.

FIG. 6 is an end view taken from the left-hand side of FIG. 2.

DESCRIPTION OF THE PREFERRED EMBODIMENT

Figure 9:
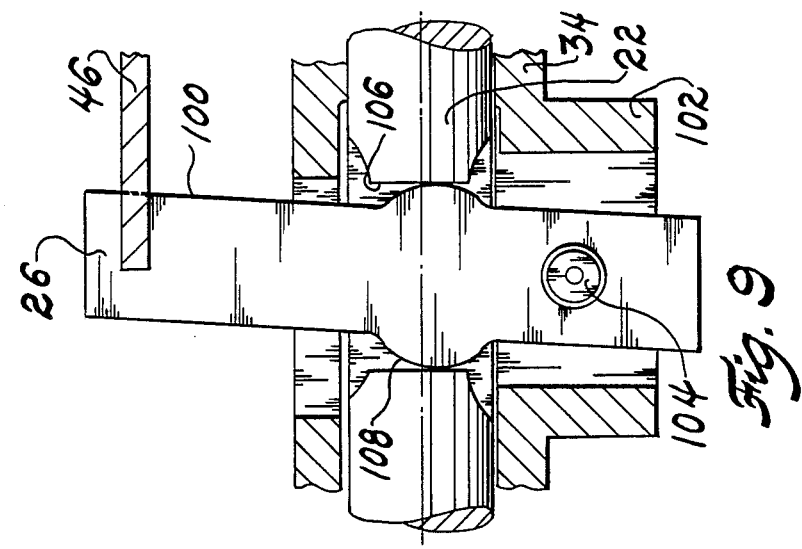
FIG. 9 is a cross section taken at plane 9—9 of FIG. 1 showing a connection between the selector lever and plunger.
Figure 8:
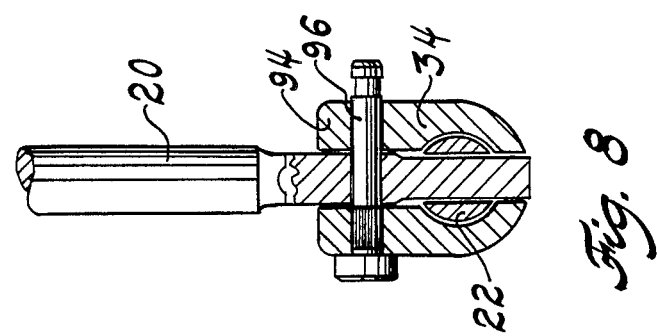
FIG. 8 is a cross section taken at plane 8—8 of FIG. 7.

Referring first to FIG. 1, a transmission control selector assembly 10 is shown mounted on a steering column assembly 12 of a motor vehicle. The steering column assembly 12 is shown in FIG. 1; the transmission selector assembly is shown in detail there and in FIG. 2. The steering column assembly includes a steering shaft and yoke assembly 14, where, at one end 16, the steering wheel is mounted and, at the opposite end 18, a steering column lower yoke is connected to the steering mechanism. The yoke transmits input control of the vehicle operator to the front wheels of the vehicle. The steering column assembly also includes a receptacle 19 where the ignition key is inserted into an ignition switch 20 and rotated between START, RUN, OFF, LOCK, and ACCESSORY positions.

A shift lever 20 extends radially outward from a pivoted connection to a free end whose position is controlled manually by the vehicle operator. The lever is connected at a first attachment to a plunger 22, which extends parallel to the axis 24 of the steering column to a second attachment to a selector lever 26. A tube 34 is surrounded by clamps 38, 40, which are fixed by bolts 42, 44, respectively, to the upper surface of the steering column assembly. The clamps permit rotation of the tube but prevent its displacement.

A control selector arm 28 is bolted at 30, 32 to the end of tube 34, within which the plunger is located. The selector arm carries a stud 36, connected to a mechanism which controls the position of a manual valve within an automatic transmission. Axial displacement and rotation of the selector lever with respect to the axis of the plunger is transmitted to the manual valve. A transmission control selector position insert 46 is connected by bolts 48 to the steering column assembly. Insert 46 defines multiple steps or detent surfaces spaced angularly about the axis 50 of the plunger. Lever 26 extends radially outward from the plunger into the system of detents on the insert and is biased into contact with the bottom of the detents by the action of a compression spring 52, located between an inner face of selector arm 28 and the end 54 of the plunger.

The ignition switch assembly includes a rack 58 having gear teeth 60 formed on its lower surface and continually meshing with the teeth of steering column locking gear wheel 62, which is turned by the vehicle operator as the ignition key is rotated within the ignition switch 20. Rack 58 is moved by rotation of the gear axially parallel to the axis 50 and is connected to a steering column lock actuator 64 at a pivoted connection 66, which permits the upper end of the steering column assembly, 14, 16 to pivot with respect to the yoke portion 18. Actuator 64 defines a cam surface 68 and a lower surface 70 against which steering column locking pawl 72 is resiliently held in contact about a pivoted connection 74.

The lower surface of tube 34 defines an elongated slot 76 sized to receive the free end of the pawl. As the ignition switch is rotated, rack 58 moves axially and carries actuator 64 and its cam surface 68 toward the pawl, thereby causing the pawl to pivot about axis 74 and to move the free end of the pawl through slot 76 and into a recess 78, located between shoulders 80, 82 formed on plunger 22. When the pawl is so located within recess 78, it prevents axial movement, but permits rotation of the plunger.

FIG. 5 shows insert 46 viewed from above the axis of the steering column. An array of detent surfaces 84, 86, 88, 90, 92, each corresponding to Park, reverse, neutral, drive or low gear positions of gear selector lever 20 are formed on the insert angularly spaced about the plunger axis. FIG. 6 shows the relative positions of the component of the selector mechanism as viewed from the left-hand side of FIG. 2.

Figure 7:
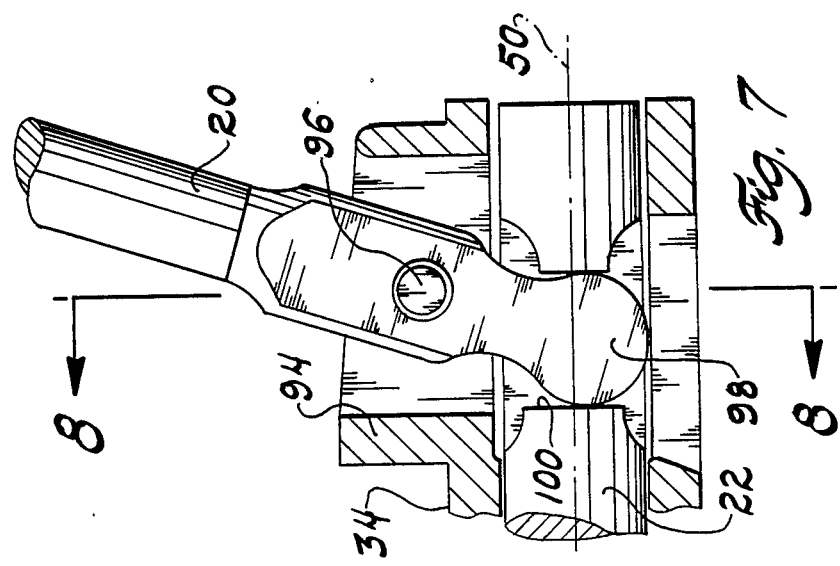
FIG. 7 is a cross section taken at plane 7—7 of FIG. 1 showing a connection between the shift lever and plunger.

Referring now to FIG. 7, in the vicinity of the shift lever attachment, tube 34 defines an annular flange 94 in which pin 96 is retained to pivotably support the lever about the axis of the pin. The lever is formed with an end 98 having a circular cylindrical cross section, fitted in continuous contact with surfaces facing axially opposite ends of the plunger and located within slot 100, formed near the end of plunger 22. As lever 20 is pivoted about the axis of pin 96, the plunger moves parallel to its axis within the tube. As lever 20 pivots about axis 50, tube 34 and the plunger rotate about the axis.

At the opposite end of the plunger, tube 34 defines another circular flange 102, which surrounds the lower end of selector lever 26 and through which a second pin 104 is inserted to provide a pivot on which the lever rotates. Lever 26 is fitted in continuous contact with axially opposite surfaces within slot 106, formed through plunger 22. In this way, movement of shift lever 20 transversely with respect to axis 50 causes lever 26 to rotate about axis 50 into alignment with the various detents on insert 46. Axial movement of shift lever 20 moves edge 110 of lever 26 toward and away from the detent surfaces of the insert.

The nature of the connection between the surfaces on levers 20 and 26 within their respective slots 100 and 106 in the plunger assures continuous metal-to-metal contact between the levers and plunger. Therefore, if selector lever 20 is suddenly released while lever 26 is distant from a detent surface on insert 46, spring 52 immediately forces edge 110 into contact with the detent with which it is angularly aligned. The entire mass of the plunger, selector control lever 26 and shift lever 20 moves as a unit against the force of the spring because the members of the unit abut one another.

The ignition key moves among the five positions spaced angularly about the axis of the switch. The engine starter is actuated with the ignition key in the Start position and, as is conventional, the ignition switch is loaded by a spring to move automatically from start to run when the key is released. The ignition key can be removed from the ignition switch only when the key is rotated to the Lock position. When the shift mechanism is moved to the Park position, recess 78 and slot 76 are mutually aligned axially and with the free end of pawl 72. When the shift mechanism is so disposed, rotation of the ignition switch and key to the Lock position causes the steering column lock actuator assembly 64 to move rightward from the position shown in FIG. 2, thereby causing pawl 72 to pivot against the effect of spring 52 as it rises on cam surface 68, extends through slot 76 and enters recess 78. In this position, the shift mechanism is prevented from being moved from the Park position. Axial motion is prevented in either direction because the pawl abuts the shoulders adjacent recess 78. Rotation is prevented because lever 26 cannot be rotated from contact with Park detent surface 84 unless it is moved axially to clear the surface of insert 46 that separates detent surfaces 84 and 86.

Similarly, the ignition key cannot be removed from the ignition switch unless the shift mechanism is in the Park position because, when the shift mechanism is in any other position, shoulders 80 and 82 on plunger 22 close slot 76, prevent pawl 72 from entering recess 76. The pawl rightward displacement of steering column lock actuator 64 past the point where the pawl engages cam surface 68. Therefore, gear 62 is prevented from turning and the ignition key and switch are prevented from moving to the Lock position. Removal of the key from the ignition switch in any position other than Lock is prevented by the internal mechanism of the lock.

Having described a preferred embodiment of our invention, what we claim and desire to secure by U.S. Letters Patent is:

1. A gear shift-ignition key interlock device for coordinating independent operation of a gear shift mechanism for an automatic transmission and an engine ignition switch for a motor vehicle, comprising:

a shift lever movable among multiple positions corresponding to operating ranges of the transmission, the positions being mutually spaced angularly and axially;

a selector lever spaced axially from the shift lever;

a tube mounted for rotation about its longitudinal axis and fixed against displacement along its longitudinal axis, connected to the selector lever and shift lever for rotation therewith;

a plunger located within the tube and supported for rotation about its longitudinal axis and for displacement along its axis, connected to the selector lever and shift lever for displacement therewith;

a selector position insert located adjacent the selector lever, defining spaced detent surfaces corresponding to positions among which the shift lever moves; and spring means for biasing the selector lever toward contact with said detent surfaces.

2. The device of claim 1 further comprising movement preventing means comprising:

a pawl supported for pivotable movement;

a recess formed on the plunger, engageable by the pawl to prevent axial displacement and disengageable by the pawl to permit axial displacement by the plunger; and a cam surface contacting the pawl, moveable relative to the pawl in response to the state of the ignition switch, causing movement of the pawl into and out of engagement with the plunder.

3. The device of claim 2 further comprising:
- a gear wheel mounted for rotation in response to the state of the ignition switch;
- a switch assembly defining a toothed rack meshing with the gear wheel, supporting a cam surface contacting the pawl, whereby the pawl pivots into engagement with the plunger as the cam surface is moved relative to the pawl responsive to movement of the ignition;
- a first connection pivotably supporting the selector lever in continual contact with the movement transmitting means; and
- a second connection spaced axially from the first connection, pivotably supporting the shift lever in continual contact with the movement transmitting means.

4. The device of claim 2 wherein the movement preventing means further comprises:
- a gear wheel mounted for rotation in response to the state of the ignition switch;
- a switch assembly defining a toothed rack meshing with the gear wheel, supporting a cam surface, contacting the pawl whereby the pawl pivots into engagement with the plunger as the cam surface is moved relative to the pawl responsive to movement of the ignition switch.

5. The device of claim 2 wherein:
- the tube defines a slot through its wall adjacent the pawl; and
- the plunger defines a recess aligned axially with the slot when the selector lever is seated on a detent surface corresponding to a predetermined shift lever position.

6. The device of claim 3 wherein:
- the tube defines a slot through its wall adjacent the pawl; and
- the plunger defines a recess aligned axially with the slot when the selector lever is seated on a detent surface corresponding to a predetermined shift lever position.

7. The device of claim 4 wherein:
- the tube defines a slot through its wall adjacent the pawl; and
- the plunger defines a recess aligned axially with the slot when the selector lever is seated on a detent surface corresponding to a predetermined shift lever position.

8. The device of claim 5 wherein the cam pivots the pawl through the slot into the recess when the shift lever is in the Park position and the ignition switch is in a lock position.

9. The device of claim 6 wherein the cam pivots the pawl through the slot into the recess when the shift lever is in the Park position and the ignition switch is in a lock position.

10. The device of claim 7 wherein the cam pivots the pawl through the slot into the recess when the shift lever is in the Park position and the ignition switch is in a lock position.

11. A gear shift-ignition key interlock device for coordinating independent operation of a gear shift mechanism for an automatic transmission and an engine ignition switch for a motor vehicle, comprising:
- a steering column assembly for supporting a steering wheel controlled by the vehicle operator and connected to a steering mechanism;
- a shift lever having a free end movable among multiple positions corresponding to operating ranges of the transmission, the positions being mutually spaced angularly about the steering column and axially along the steering column;
- a selector lever spaced axially along the steering column from the shift lever;
- means for converting axial movement of the shift lever along the steering column to axial movement of the selector lever and for converting angular movement of the shift lever about the steering column to angular movement of the selector lever;
- a selector position insert located adjacent the selector lever, defining spaced detent surfaces corresponding to positions among which the shift lever moves; and
- spring means for biasing the selector lever toward contact with said detent surfaces movement of the shift lever.

* * * * *